(12) United States Patent
Desaulniers (10) Patent No.: US 9,725,284 B2
(45) Date of Patent: Aug. 8, 2017

(54) REMOTE SLING RELEASE FOR CRANE

(71) Applicant: Paul Desaulniers, Varennes (CA)

(72) Inventor: Paul Desaulniers, Varennes (CA)

( * ) Notice: Subject to any disclaimer, the term of this patent is extended or adjusted under 35 U.S.C. 154(b) by 0 days.

(21) Appl. No.: 14/186,031

(22) Filed: Feb. 21, 2014

(65) Prior Publication Data

US 2015/0239712 A1    Aug. 27, 2015

(30) Foreign Application Priority Data

Feb. 21, 2013  (GB) .................................. 1303118.2

(51) Int. Cl.
  *B66C 1/36* (2006.01)
  *B66C 13/18* (2006.01)
  *B66C 15/06* (2006.01)

(52) U.S. Cl.
  CPC ................ *B66C 1/36* (2013.01); *B66C 13/18* (2013.01); *B66C 15/065* (2013.01)

(58) Field of Classification Search
  CPC .............. B66C 1/36; B64D 1/12; B64D 17/38
  USPC .... 294/75, 82.3, 82.33, 82.24, 82.26, 82.31; 292/215, 216; 24/598.4, 598.7, 599.1, 24/599.5, 599.6, 599.7, 600.1, 600.3
  See application file for complete search history.

(56) References Cited

U.S. PATENT DOCUMENTS

| | | | |
|---|---|---|---|
| 2,868,581 A | 1/1959 | Minty et al. | |
| 2,904,369 A | 9/1959 | Campbell | |
| 3,016,257 A * | 1/1962 | White | B64D 1/22 258/1.2 |
| 3,056,624 A | 10/1962 | Nardone | |
| 3,179,461 A * | 4/1965 | Rose | B66C 1/34 294/82.33 |
| 3,311,401 A | 3/1967 | Bacon | |
| 3,341,244 A * | 9/1967 | Johnson | B66C 1/38 294/75 |
| 3,578,373 A * | 5/1971 | Metz | B66C 1/34 294/82.3 |
| 3,610,674 A * | 10/1971 | Janssen | B63B 21/56 244/137.3 |

(Continued)

*Primary Examiner* — Paul T Chin (57) ABSTRACT

An improved remote sling release for a crane has a main plate member including an access hole for attaching a main crane hoisting line therethrough, a hook portion located at an opposite end from the access hole and adapted to selectively hold securely or release sling members thereon. Two sling ejector plate members connected to one another such that the ejector plate members are pivotally attached to the main plate member, wherein each of the sling ejector plate member has a sling notch therein adapted to receive the sling members of a hoist pallet therein. A sling access handle member attached to at least one of the sling ejector plate members and used to manually rotate the ejector plate members from an open position for receiving the sling members therein and into a closed position, wherein the sling member are locked upon the hook portion of the main plate member. A remotely controlled solenoid mechanism attached to the main plate member and adapted to unlock the locking mechanism, and a first traction spring member adapted to bias the ejector plate members into the open position and force the sling members off of the hook portion. A remote control mechanism adapted to remotely activate the solenoid mechanism, to force the sling members off of the hook portion.

12 Claims, 5 Drawing Sheets

(56) References Cited

U.S. PATENT DOCUMENTS

| | | |
|---|---|---|
| 3,625,558 A | 12/1971 | Johnson |
| 3,811,720 A | 5/1974 | Epstein |
| 3,845,978 A * | 11/1974 | Huber ................... B66C 1/34 294/82.3 |
| 3,918,758 A * | 11/1975 | Fournier ................. B66C 1/36 24/599.7 |
| 4,073,531 A | 2/1978 | Androski |
| 4,174,132 A * | 11/1979 | Crook, Jr. .................... 294/82.3 |
| 4,572,563 A * | 2/1986 | Fontana ................. B66C 1/34 294/75 |
| 4,678,219 A * | 7/1987 | Smith et al. ................ 294/82.33 |
| 5,040,747 A * | 8/1991 | Kane ...................... B64C 25/26 244/102 R |
| 5,178,427 A * | 1/1993 | Jorritsma .................. B66C 1/38 294/82.3 |
| 5,687,931 A * | 11/1997 | Hogan ................ B64D 17/383 244/151 B |
| 6,241,298 B1 | 6/2001 | Whyte et al. |
| 6,375,242 B1 * | 4/2002 | Zingerman ................. 294/82.3 |
| 6,811,118 B2 * | 11/2004 | Collet et al. ............ 244/102 SL |
| 6,838,996 B2 | 1/2005 | Deimel |
| 7,380,849 B2 | 6/2008 | Mongan |
| 7,883,125 B2 * | 2/2011 | Smith, III ............... B64C 25/26 292/201 |
| 7,954,766 B2 | 6/2011 | Brainard et al. |
| 8,016,333 B2 * | 9/2011 | Brunner ................... B66C 1/34 294/82.2 |
| 8,172,184 B2 * | 5/2012 | Spencer et al. ............ 244/137.4 |
| 2004/0026348 A1 | 2/2004 | Shaw |

* cited by examiner

REMOTE SLING RELEASE FOR CRANE

FIELD OF THE INVENTION

The present invention relates generally to construction equipment but more particularly to a disconnecting device for releasing slings on a crane.

BACKGROUND OF THE INVENTION

Crane operators have to be skilled in order to unhook a load that they have lifted to its final destination. It is usually done by not using the safety latch so that the crane operator can simply drop the load on a resting surface, release tension on the hook and hope that by swinging the line, the hook will free itself. This can take 3 or 4 tries. If the crane Improved remote controlled hook release operator is unsuccessful, a worker has to release the hook, which can be a dangerous task to do.

SUMMARY OF THE INVENTION

In view of the foregoing disadvantages inherent in the known devices now present in the prior art, the present invention, which will be described subsequently in greater detail, is to provide objects and advantages which are:

To provide for a remote control disconnecting device for cranes.

In order to do so, the invention is attached either onto an existing hook from a crane or directly to the hoisting cable(s) and comprises sling ejector plates pushing out slings from a hook portion. The sling ejector plates are rotationally attached to a main plate. When the slings are first put onto the hook portion, the sling ejector plates are in a first configuration. A user then pushes down on a sling access handle member so as to securely lock the slings onto the hook portion.

Doing so, pulls on a first traction spring as a sling ejector plate member rotates until a locking mechanism rotates and engages a locking pin into a locking pin slot. As the locking mechanism rotates, it pulls on a second traction spring member. At this point, everything is securely locked and under tension.

When comes time to releasing the slings, a remote control mechanism actuates a solenoid mechanism which pulls on a cam member which in turn releases the locking pin from the locking wheel. Doing so, and with the help of the second traction spring, the locking wheel is free to rotate so that first traction spring can pull on the sling release member which pushes the slings out of the hook portion.

The solenoid is actuated remotely by a crane operator and works on radio frequency using an antenna and a signal receiver.

A first signal from the crane operator actuates an audible alarm, after three seconds, the operator releases the slings. For safety measures, if the crane operator does not actuate the release within three seconds, he has to replay the alarm once again.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

DETAILED DESCRIPTION OF THE PREFERRED EMBODIMENT

Figures 1A, 1B:
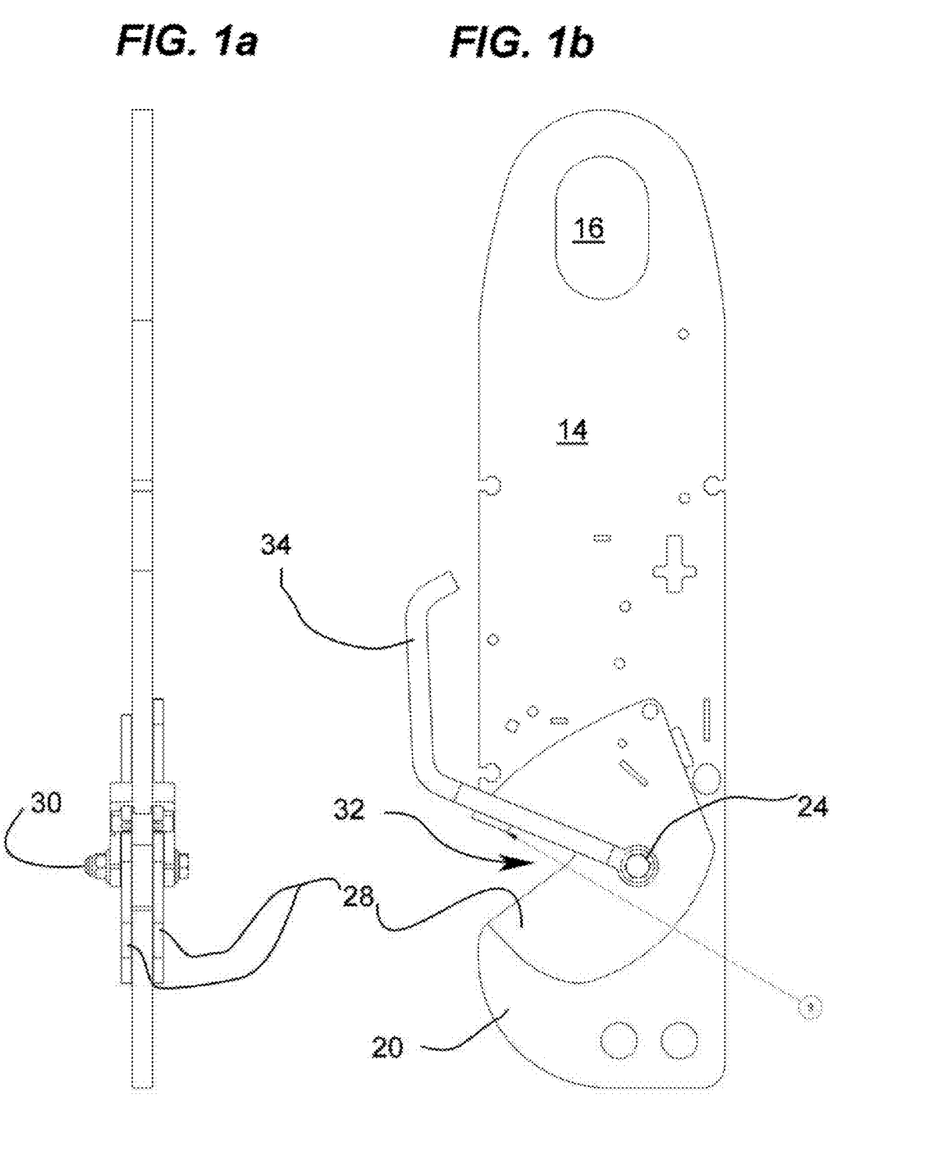
FIGS. 1a-b Front and side views of the main plate.
Figure 5:
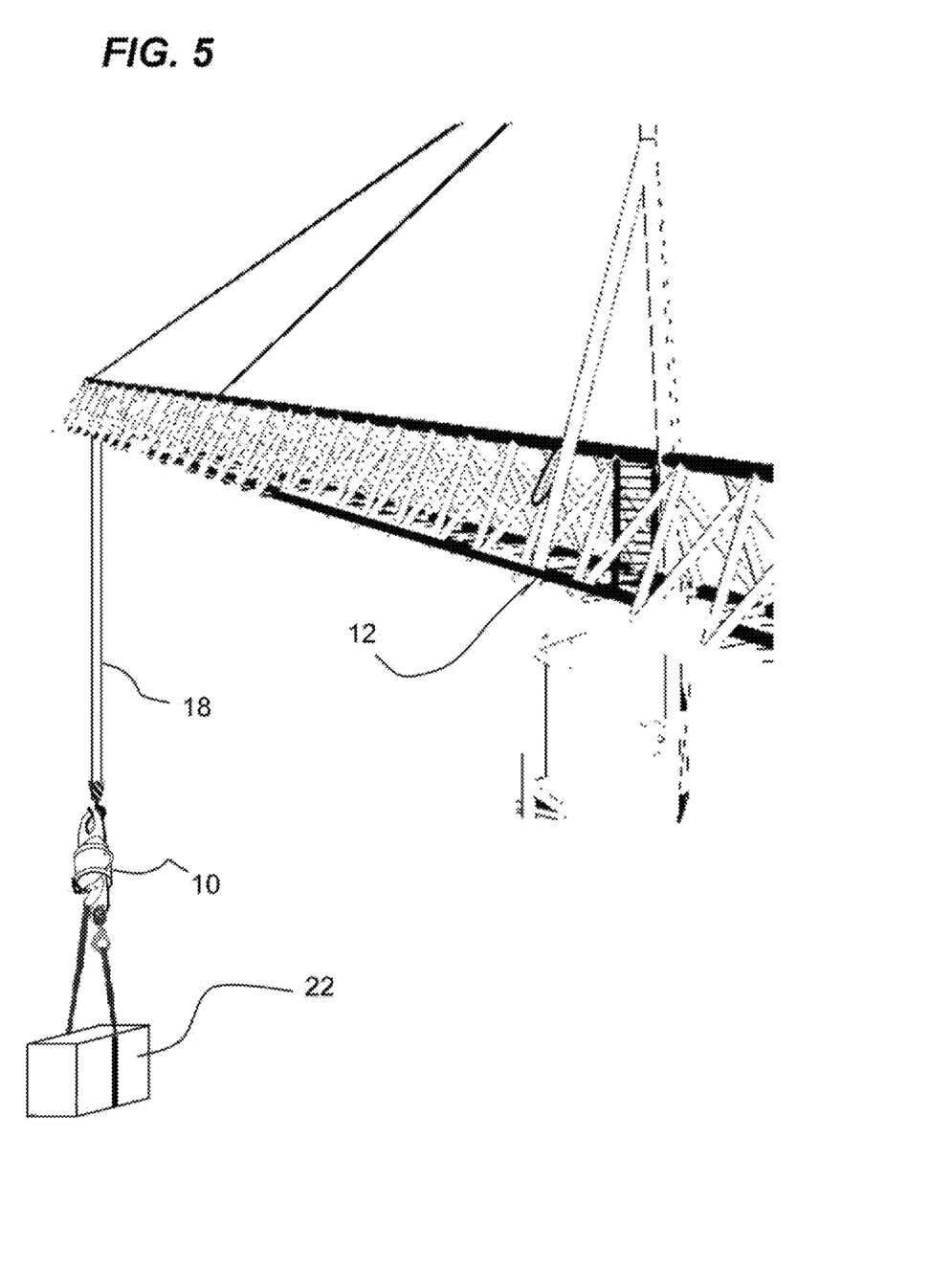
FIG. 5 Isometric view of the invention in context with a crane.

An improved remote hook release (10) for a mechanical crane (12) has a main plate member (14) including an access hole (16) for attaching a main crane hoisting line (18) there through. A hook portion (20) located at an opposite end from the access hole (16) and adapted to hold sling members (22), securely thereon, an axle hole (24) there through, and a spring holder (26) extending from a surface thereon. Two sling ejector plate members (28) connected to one another by an elongated axle (30) placed through the axle hole (24), such that the ejector plate members (28) are pivotally attached to the main plate member (14), wherein each of the sling ejector plate member (28) has a sling notch (32) therein adapted to receive the sling members (22) therein.

A sling access handle member (34) attached to both ejection plate (28) and used to manually rotate them from an open position for receiving the sling members (22) therein and into a closed position, wherein they are locked upon the hook portion (20) of the main plate member (14).

A locking mechanism (36) is attached to the main plate member (14) and is adapted to lock the ejector plate members (28) in the closed position. A remotely controlled solenoid mechanism (58) is attached to the main plate member (14) and is adapted to unlock the locking mechanism (36). A first traction spring member (40) is connected between the main plate spring holder (26) and one of the two sling ejector plate members (28) and is adapted to bias them into the open position and force the sling members (22) off of the hook portion (20).

A remote control mechanism (not shown) is adapted to remotely activate the solenoid mechanism (58), and thereby remotely force the sling members (22) off of the hook portion (20).

Figure 3A:
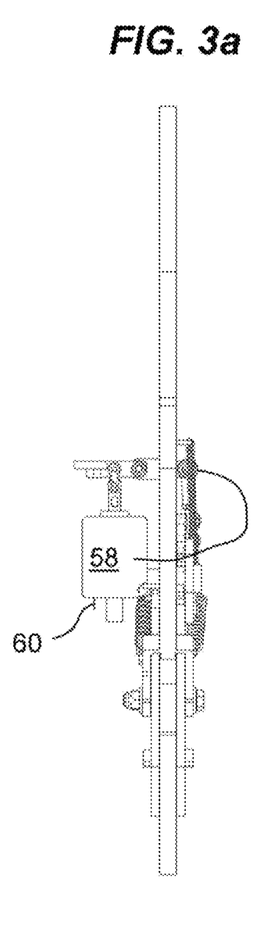
FIGS. 3a-c Front, side, and side detail of the inside of the invention.
Figure 3B:
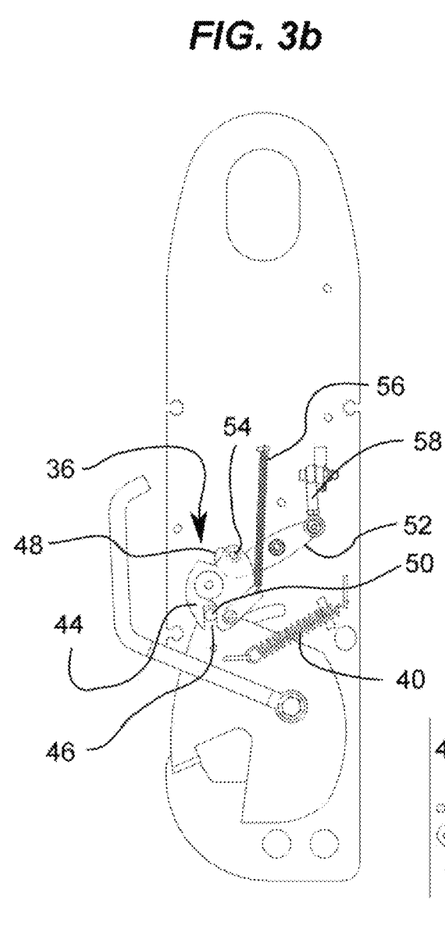
Figure 3C:
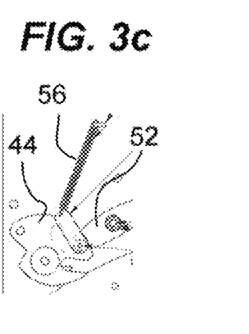

The locking mechanism (36) includes a locking wheel (44) rotatably connected to one side of the main plate member (14), and has a locking pin slot (46) located along its circumference, and a stub notch (48) located along its circumference spaced from the locking pin slot (46). A locking pin (50) attached to an ejector plate member (28) located on the same side of the main plate member (14) as the locking wheel (44) and adapted to fit within and engage the locking pin slot (46) when the ejector plate member (28) is rotated into the closed position and thereby rotate the locking wheel (44).

A cam member (52) pivotally connected to the one side of the main plate member (14) and adjacent the locking wheel (44) and including a stub member (54) adapted to engage the stub notch (48) when the locking wheel (44) is rotated by the locking pin (50). The cam member (52) is mechanically connected to and pivotally moved by the solenoid mechanism (58); and a second traction spring member (56) connected between the main plate member (14) and the locking wheel (44) and used to bias it and rotating it and releasing the locking pin (50) of the ejector plate member (28), such that when the sling access handle member (34) is being pulled down to secure the sling members (22) onto the hook portion (20) of the main plate member (14), the ejector plate locking pin (50) engages the locking pin slot (46) thereby rotating the locking wheel (44) until the cam member stub member (54) engages the locking wheel stub notch (48) and stops the locking wheel (44) from rotating, which in turn locks the ejector plate members (28) in place and thereby can securely hold the sling members (22) upon the hook portion (20).

When the solenoid mechanism (58) is remotely activated, it pivots the cam member (52) and disengages the stub member (54) from the locking wheel stub notch (48). In following, the second traction spring member (56) rotates the locking wheel (44) until the locking pin (50) disengages therefrom and allows the ejector plate members (28) to rotate in to the open position, which in turn forces the sling members (22) off of the hook portion (20).

Figure 4:
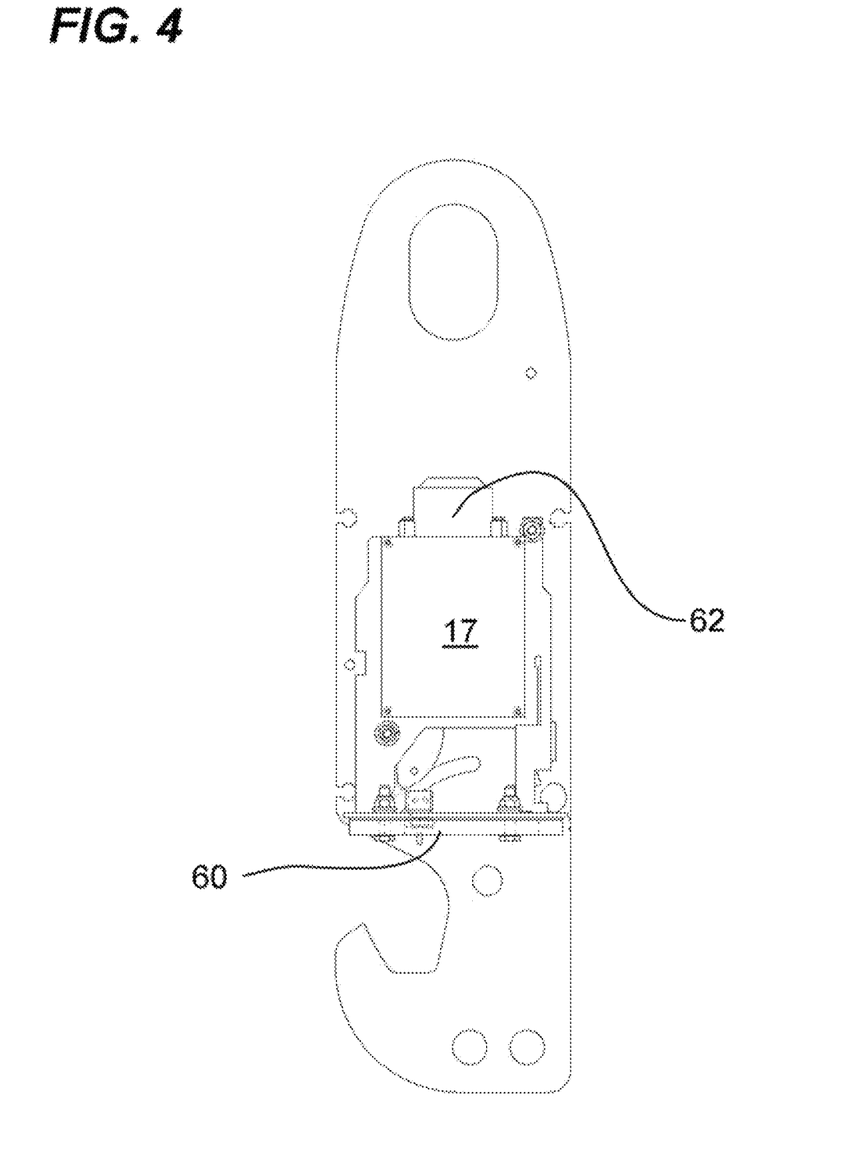
FIG. 4 Side view showing the receiver and antenna.

The solenoid mechanism (58) receives its signal from a radio signal receiver (17) which includes an antenna (60) adapted to receive radio signal from the remote control mechanism which is adapted to be controlled by a crane operator.

An audible alarm mechanism (62) is controlled by the signal receiver ( ) further controls the audible alarm mechanism (62), and adapted such that when the crane operator sends a radio signal to the solenoid mechanism (58) an alarm sounds prior to the solenoid mechanism (58) unlocking the locking mechanism (36) warns of an impending release of the sling members (22).

Figure 2A:
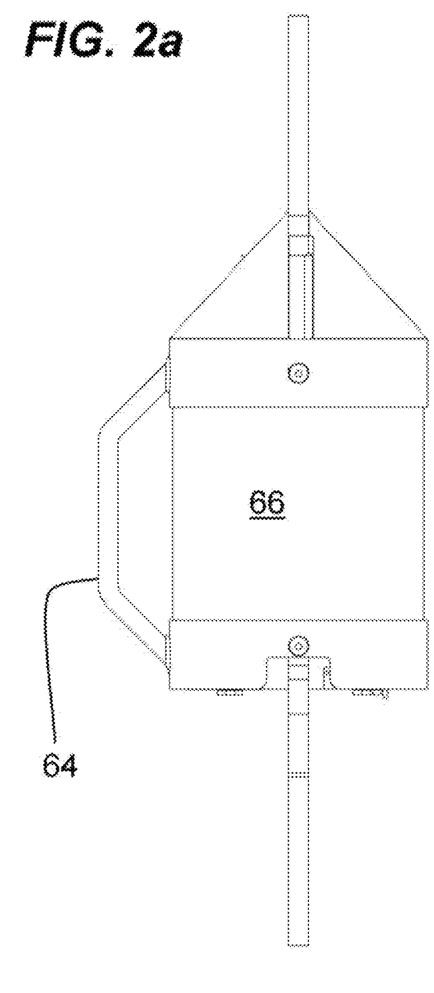
FIGS. 2a-b Front and side views of the invention with cover.
Figure 2B:
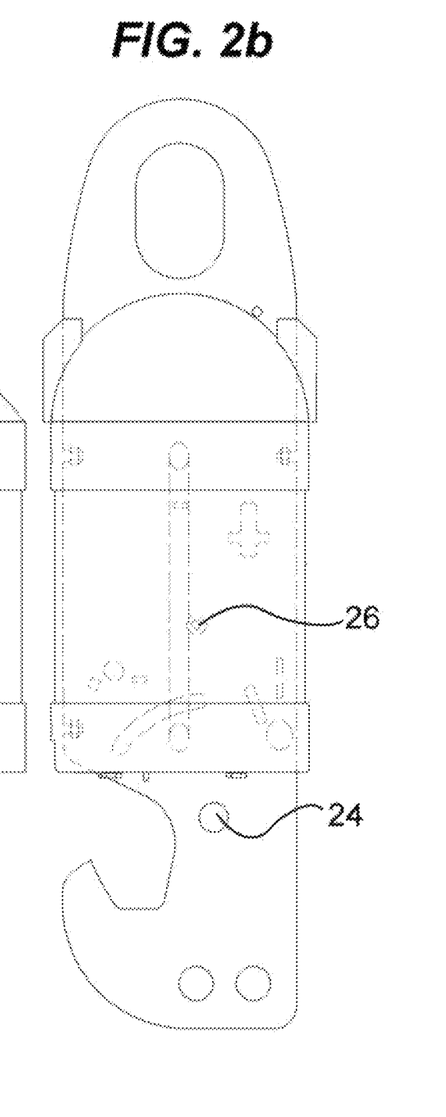

Other components include a carrying handle (64) attached to the main plate member (14) that is adapted to allow a person to firmly hold onto the hook release (10) while pulling down on the sling access handle member (34) to secure the sling members (22) upon the hook portion (20). A cover (66) is removably attached to the main plate member (14) and is adapted to cover most of the mechanical moving parts attached to the main plate member (14). The improved remote hook release is used in combination with a mechanical crane (12).

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. An improved remote sling release for a crane, said sling release comprising a main plate member including an access hole for attaching a main crane hoisting line therethrough, a hook portion located at an opposite end from said access hole adapted to selectively hold securely or release sling members thereon, an axle hole therethrough, and a spring holder extending from a surface thereon; two sling ejector plate members connected to one another by an elongated axle placed through said axle hole in said main plate member, such that said ejector plate members are pivotally attached to said main plate member, wherein each said sling ejector plate member has a sling notch therein adapted to receive said sling members; a sling access handle member attached to at least one of said sling ejector plate members and used to manually rotate said ejector plate members from an open position for receiving said sling members therein and into a closed position, wherein said sling member are locked upon said hook portion of said main plate member; a locking mechanism attached to said main plate member and adapted to lock said ejector plate members in said closed position; a remotely controlled solenoid mechanism attached to said main plate member and adapted to unlock said locking mechanism; and a first traction spring member connected between said main plate spring holder and one of said two sling ejector plate members and adapted to bias said ejector plate members into said open position and force said sling members off of said hook portion of said main plate member; and a remote control mechanism adapted to remotely activate said solenoid mechanism, and thereby remotely force said sling members off of said hook portion of said main plate member.

2. The improved remote hook release of claim 1, wherein said locking mechanism includes a locking wheel rotatably connected to one side of said main plate member, said locking wheel having a locking pin slot located along its circumference and a stub notch located along its circumference spaced from said locking pin slot; a locking pin attached to an ejector plate member located on the same side of said main plate member as said locking wheel and is adapted to fit within and engage said locking pin slot when said ejector plate member is rotated into said closed position and thereby rotate said locking wheel; a cam member pivotally connected to said one side of said main plate member and adjacent said locking wheel and includes a stub member adapted to engage said locking wheel stub notch when said locking wheel is rotated by said locking pin of said ejector plate member, and wherein said cam member is mechanically connected to and pivotally moved by said solenoid mechanism; and a second traction spring member connected between said main plate member and said locking wheel and used to bias said locking wheel thereby rotating it and releasing said locking pin of said ejector plate member, such that when said sling access handle member is being pulled down to secure said sling members onto said hook portion of said main plate member said ejector plate locking pin engages said locking pin slot of said locking wheel thereby rotating said locking wheel until said cam member stub member engages said locking wheel stub notch and stops the locking wheel from rotating, which in turn locks the ejector plate members in place and thereby can securely hold said sling members upon said hook portion of said main plate member, and wherein when said solenoid is remotely activated it pivots said cam member and disengages said cam member stub member from said locking wheel stub notch, in following, said second traction spring rotates said locking wheel until said locking pin of said ejector plate member disengages therefrom and allows said ejector plate members to rotate in to said open position, which in turn forces said sling members off of said hook portion of said main plate member.

3. The improved remote sling release of claim 2, wherein said solenoid mechanism receives a signal from a radio signal receiver which includes an antenna adapted to receive radio signal from said remote control mechanism which is adapted to be controlled by a crane operator.

4. The improved remote sling release of claim 3, further comprising an audible alarm mechanism attached to said main plate member, wherein said solenoid further controls said audible alarm mechanism, and adapted such that when said crane operator sends a radio signal to said solenoid mechanism an alarm sounds prior to said solenoid mechanism unlocking said locking mechanism, thereby warning of an impending release of said sling members.

5. The improved remote sling release of claim 2, further comprising a carrying handle attached to said main plate member that is adapted to allow a person to firmly hold onto said hook release while pulling down on said sling access handle member to secure said sling members upon said hook portion of said main plate member.

6. The improved remote sling release of claim 2, further comprising a cover removably attached to said main plate member and adapted to cover most of the mechanical moving parts attached to said main plate member.

7. A combination of a mechanical crane and an improved remote sling release, said combination comprising a mechanical crane having an elongated boom, a main crane hoisting line extending through said boom and down towards the ground, and a hook connector at a distal end of said hoisting line; and an improved remote sling release comprising a main plate member including an access hole for attaching said main crane hoisting line therethrough, a hook portion located at an opposite end from said access hole and adapted to selectively hold securely or release sling members thereon, an axle hole therethrough, and a spring holder extending from a surface thereon; two sling ejector plate members connected to one another by an elongated axle placed through said axle hole in said main plate member, such that said ejector plate members are pivotally attached to said main plate member, wherein each said sling ejector plate member has a sling notch therein adapted to selectively receive or remove said sling members therein; a sling access handle member attached to at least one of said sling ejector plate members and used to manually rotate said ejector plate members from an open position for receiving said sling members therein and into a closed position, wherein said sling member are locked upon said hook portion of said main plate member; a locking mechanism attached to said main plate member and adapted to lock said ejector plate members in said closed position; a remotely controlled solenoid mechanism attached to said main plate member and adapted to unlock said locking mechanism; and a first traction spring member connected between said main plate spring holder and one of said two sling ejector plate members and adapted to bias said ejector plate members into said open position and force said sling members off of said hook portion of said main plate member; and a remote control mechanism adapted to remotely activate said solenoid mechanism, and thereby remotely force said sling members off of said hook portion of said main plate member.

8. The improved remote hook release of claim 7, wherein said locking mechanism includes a locking wheel rotatably connected to one side of said main plate member, said locking wheel having a locking pin slot located along its circumference and a stub notch located along its circumference spaced from said locking pin slot; a locking pin attached to an ejector plate member located on the same side of said main plate member as said locking wheel and is adapted to fit within and engage said locking pin slot when said ejector plate member is rotated into said closed position and thereby rotate said locking wheel; a cam member pivotally connected to said one side of said main plate member and adjacent said locking wheel and includes a stub member adapted to engage said locking wheel stub notch when said locking wheel is rotated by said locking pin of said ejector plate member, and wherein said cam member is mechanically connected to and pivotally moved by said solenoid mechanism; and a second traction spring member connected between said main plate member and said locking wheel and used to bias said locking wheel thereby rotating it and releasing said locking pin of said ejector plate member, such that when said sling access handle member is being pulled down to secure said sling members onto said hook portion of said main plate member said ejector plate locking pin engages said locking pin slot of said locking wheel thereby rotating said locking wheel until said cam member stub member engages said locking wheel stub notch and stops the locking wheel from rotating, which in turn locks the ejector plate members in place and thereby can securely hold said sling members upon said hook portion of said main plate member, and wherein when said solenoid is remotely activated it pivots said cam member and disengages said cam member stub member from said locking wheel stub notch, in following, said second traction spring rotates said locking wheel until said locking pin of said ejector plate member disengages therefrom and allows said ejector plate members to rotate in to said open position, which in turn forces said sling members off of said hook portion of said main plate member.

9. The improved remote hook release of claim 8, said solenoid mechanism receives a signal from a radio signal receiver which includes an antenna adapted to receive radio signal from said remote control mechanism which is adapted to be controlled by a crane operator.

10. The improved remote hook release of claim 9, further comprising an audible alarm mechanism attached to said main plate member, wherein said solenoid further controls said audible alarm mechanism, and adapted such that when said crane operator sends a radio signal to said solenoid mechanism an alarm sounds prior to said solenoid mechanism unlocking said locking mechanism, thereby warning of an impending release of said sling members thereon.

11. The improved remote sling release of claim 8, further comprising a carrying handle attached to main plate member that is adapted to allow a person to firmly hold onto said sling release while pulling down on said sling access handle member to secure said sling members upon said hook portion of said main plate member.

12. The improved remote sling release of claim 8, further comprising a cover removably attached to said main plate member and adapted to cover most of the mechanical moving parts attached to said main plate member.

* * * * *